United States Patent
Tade, III et al.

[11] Patent Number: 5,169,594
[45] Date of Patent: Dec. 8, 1992

[54] METHOD OF REMOTELY INSTALLING OR REMOVING A NOZZLE DAM

[75] Inventors: Lee A. Tade, III, Hixson; Bobby J. Presley, Harrison, both of Tenn.; Lawrence R. Hayes, Ringgold, Ga.; Eric M. Weisel, Windsor Locks, Conn.

[73] Assignee: Combustion Engineering, Inc., Windsor, Conn.

[21] Appl. No.: 828,550

[22] Filed: Jan. 30, 1992

[51] Int. Cl.$^5$ .............................................. G21C 19/00
[52] U.S. Cl. .................................................. 376/260
[58] Field of Search ............... 376/260, 204, 203, 277, 376/463; 29/723, 726, 906, 428, 890.031; 165/71, 76, 11.2; 138/89, 93; 277/1, 135; 122/379; 49/506, 477; 220/262, 232, 233

[56] References Cited

U.S. PATENT DOCUMENTS

| | | | |
|---|---|---|---|
| 4,482,076 | 11/1984 | Wentzell | 376/204 |
| 4,483,457 | 11/1984 | Schukei et al. | 138/93 |
| 4,744,392 | 5/1988 | Tade, III et al. | 376/203 |
| 4,770,235 | 9/1988 | Rogers, Jr. et al. | 376/204 |
| 5,006,302 | 4/1991 | Trundle et al. | 376/260 |
| 5,032,350 | 7/1991 | McDonald et al. | 376/260 |

OTHER PUBLICATIONS

Zezza, Nuclear Plant Safety, May–Jun. 1986, pp. 36-38.

Primary Examiner—Daniel D. Wasil
Attorney, Agent, or Firm—John H. Mulholland

[57] ABSTRACT

A method of remotely installing or removing and assembling and disassembling nozzle dams (10) from outside a steam generator manway (14) using a tool set. The tools are a bifurcated segment lifting (torquing and push-pull) tool 60 to unweight and faciltate the operation of sliding dam segments (30,32) edgewise along sliding brackets (40) and bars (44) in an assembly and disassembly operation; a cam-lock component (36) operating T-shaped tool (80) with a nozzle dam rib avoiding offset (88), transverse quick-connect body (50b) straddling tool (90) pull a sleeve (50c) in order to disassembly quick-connects; and, a gasket installing, tensioning and removing hook tool (102).

9 Claims, 8 Drawing Sheets

METHOD OF REMOTELY INSTALLING OR REMOVING A NOZZLE DAM

BACKGROUND OF THE INVENTION

The present invention relates to a method of remotely installing or removing a nozzle dam of a nuclear stem generator system of the type disclosed in U.S. Pat. No. 5,032,350, assigned to the assignee of the present application. The disclosure of that patent, as well as the disclosures of U.S. Pat. Nos. 4,482,076; 4,744,392; 4,770,235 and 4,483,457 mentioned therein are hereby incorporated by reference.

In performing the sliding assembly or disassembly operation of U.S. Pat. No. 5,032,350 it has been found useful to torque the segments about the mating surfaces which slide relative to each other to reduce the sliding friction force required. This is done to limit the segment edge face to edge face sliding contact and provide a slight gap therebetween. Thus, in assembly and disassembling it would be convenient to have a method to accomplish the sliding and described torquing operations from outside the head away from major radiation exposure.

Accordingly, it has been desirable to have a method of facilitating all of the assembly and disassembly operations necessary to remotely install or remove a nozzle dam from its useful position, other than those performed by a manipulator as in U.S. Pat. No. 5,032,350 or its parent application, U.S. Pat. No. 4,954,312.

The ideal method would include a procedure to assemble and disassemble the dam subassembly with slidingly assembled segments; to secure or release rib mounted spring loaded camlock components for securement or detachment of the segments; to install and tension a tabbed seal diaphragm on the dam subassemble or remove same; and, to connect and disconnect push-pull operating quick-connects to connect or disconnect the subassembly mounted remotely actuated radial dam locking pins, fluid lines; all without entry of the head of the steam generator with attendant radiation exposure.

SUMMARY OF THE INVENTION

The invention is a method of remotely installing or removing a nozzle dam in a nuclear steam generator. The steam generator has at its lower end, a head, a manway penetrating the head, a nozzle penetrating the head and a manipulator having a free end in the head. The manipulator includes a clamp mechanism for holding and orienting an inner or center nozzle dam segment while outer nozzle dam segments are secured thereto or detached, at least partially, therefrom by a sliding or a hinged action. The dam segments are sized to pass through the manway and each has means for engaging its adjacent segments thereon for assembly and secured by components into a dam subassembly which can also be disassembled by the method.

A Titan 7F manipulator or the like is mounted and arranged for orienting and translating the dam subassembly within the head to move the dam subassembly to its seat within the nozzle where it is to be locked and radially secured therein by subassembly mounted remotely activated radial pins. The manipulator also is used to move the dam from the seat after it is unlocked for removal from the seat and disassembly.

The novel method of the invention is for use in the just described broad method and is the specific procedure which involves providing and using a tool set having a plurality of elongated tools for engagement and disengagement with the dam segments and components for securement during assembly and for disassembly. This includes manually operating the tools in association with the manipulator from outside the head for operator protection and ease of use of the manipulator.

The method includes the step of physical manipulation of the elongated tools of the set from outside the head to minimize exposure of the tool operator to radiation from within the head and to avoid the necessity of the operator to enter the head while:

1. aligning the segments relative to each other for movement into or out of assembled position during manipulation of the elongated tools; and,
2. securing or detaching the segments in or from proper aligned position to form or disassemble a dam subassembly secured by components of the dam subassembly.

The aligning of the segments is a method which includes using an elongated bifurcated tool of the set to engage a segment edge and torquing one segment relative to the other to relieve edgewise sliding frictional surface contact by a resulting alignment of the segments.

The novel procedure for securing or detaching the segments is a method which includes using an elongated tool with a double offset T-shaped end to operate segment rib mounted spring loaded camlock components of the type disclosed in U.S. Pat. No. 4,744,392 "Nozzle Dam Segment Bolt and Keeper".

The method includes use of yet another elongated tool which can be manipulated from outside the head over and between the ribs of the segments to operate quick-connects in fluid lines to subassembly mounted remotely actuated radial pins including fluid lines, for example, to disconnect the fluid lines during disassembly of the segments for removal from the head. This tool includes an offset and transverse body-straddling bifurcated end for engaging the end of a quick-connect sleeve. The offset provides a portion with an axis substantially parallel to the stem and body, such that by engagement and physical manipulation of the bifurcated end against the quick connect sleeve, from the handle end at the opposite end of a shaft portion, the offset bifurcation pulls back the body sleeve to accomplish disconnection. The typical quick-connect used is a SWAGELOK ® "Keyed" quick-connect, Model QC6 (KS Blue), with the ball check removed for free flow. It is available from The Crawford Fitting co. of Solon, Oh.

Another elongated tool used in the method of the invention facilitates tensioning of the diaphragm seal tabs to install or remove the diaphragm from the dam subassembly. The tabs extend from the diaphragm periphery and preferably have an opening for hooked engagement with projections, typically screws, spaced on the subassembly peripheral margin to face the inside of the head. The tabs are tensioned for hooking and unhooking operations by providing and using an elongated tool from the tool set. It is characterized by an elongated shaft portion with a transversely extending hook end and an opposite handle end for manipulation from outside the head. The tensioning includes the step of inserting the hook end in a tab opening to provide hooking or unhooking clearance within that tab opening or an adjacent tab opening for movement of the tab into or out of hooked engagement with one of the projections. Preferably there are multiple tab openings in the tab and the opening engaged by the hooked end of the tool to which the tension is applied, is closer to the tab end than the tab opening that creates the hooked tension connection of the diaphragm to the subassembly.

The invention, then is the method of using the tools to remotely install and/or remove a nozzle dam without entering the head.

DETAILED DESCRIPTION OF THE INVENTION

Figure 1:
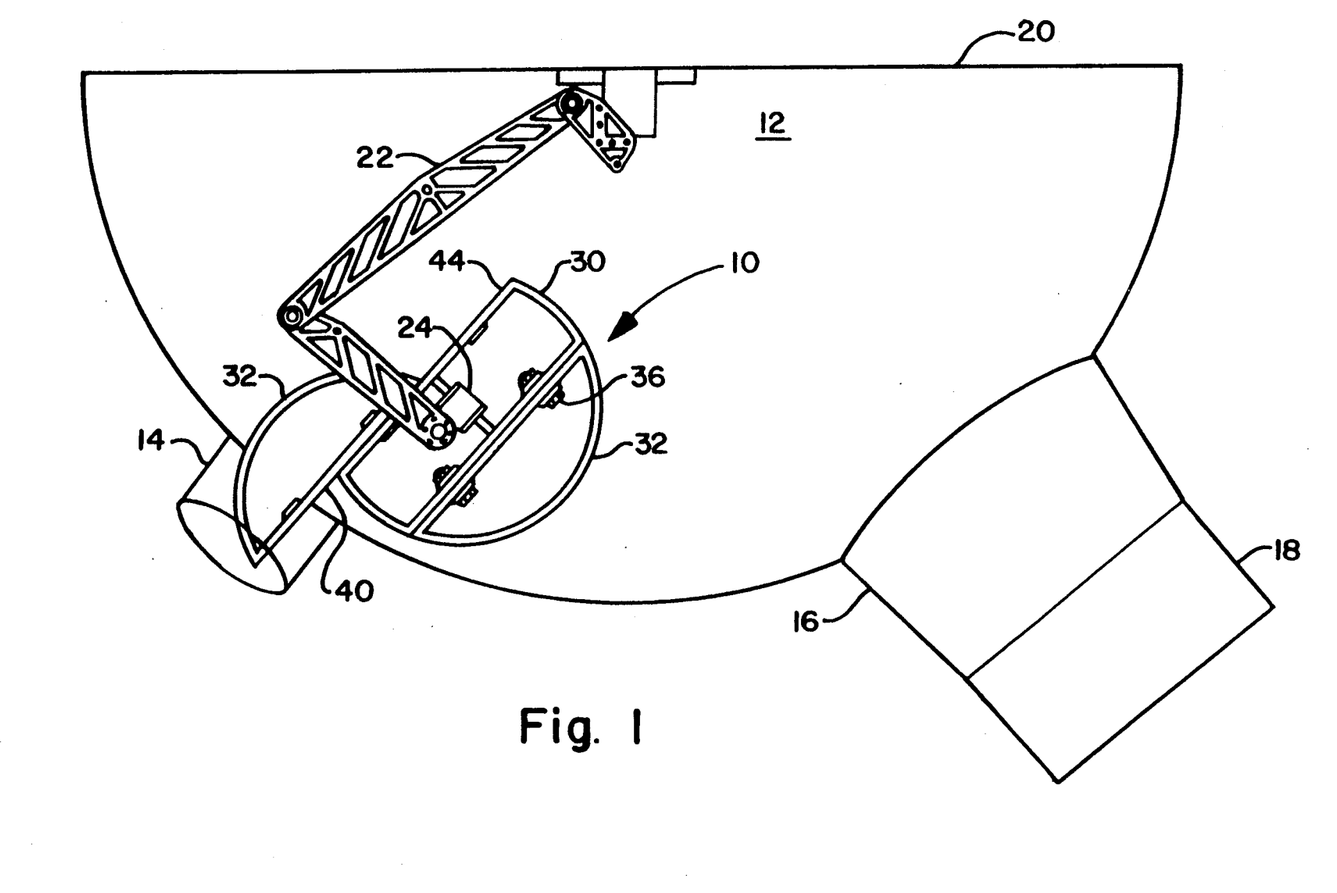
FIG. 1 is a schematic representation of a portion of the lower head of a nuclear steam generator with a nozzle dam subassembly partially assembled or disassembled.

The numeral 10 generally designates the nozzle dam or subassembly thereof, for which the method of assembly and tool set used therein comprise the invention. As seen in FIG. 1, a portion of the lower head 12 of a nuclear steam generator has a substantially circular manway 14 penetration having a first diameter and a circular or tapered nozzle 16 penetration having a second, larger diameter. The nozzle is connected to a hot or cold leg pipe 18, which contains, during normal operation, a flow of primary coolant from the nuclear reactor vessel into the steam generator. The upper portion of the lower head is defined by a tube sheet 20 which in FIG. 1 is schematically shown, and which is further shown supporting a manipulator 22 for maintenance purposes. The manipulator, typically, may be a Titan 7F available from Schilling Development Inc. of Davis, Cal. and is typically used as fully disclosed and described in U.S. Pat. No. 5,032,350 to install and remove a nozzle dam 10 in nozzle 16.

It is immaterial to the instant novel method whether the manipulator 22 is mounted within head 12, for example on tube sheet 20, or outside of head 12. The important requirement is that the manipulator 22 have, for use in head 12, a free end which includes a clamp mechanism 24 for holding an inner nozzle dam segment 30, by means of handle 31 with transverse projection 31a, while outer dam segments 32 are secured thereto or detached therefrom.

Figures 5, 13, 14:
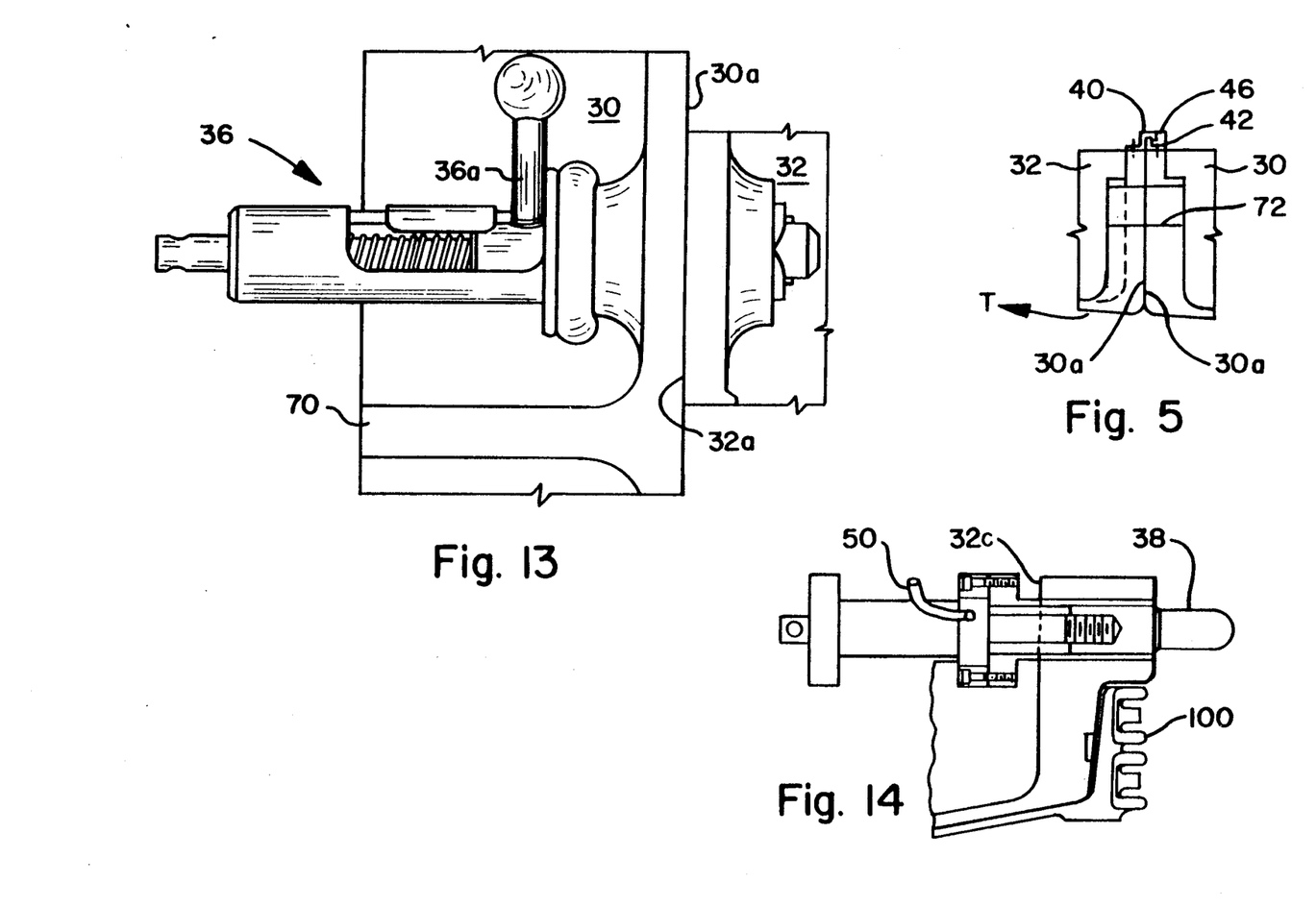
FIG. 5 is a fragmentary cross-section taken along the line 5—5 of FIG. 2.
FIG. 13 is an elevational view of a spring loaded camlock that is suitable for use in locking together the dam sections.
FIG. 14 is a cross-sectional view taken along the line 14—14 of FIG. 2.

The dam segments 30 and 32 are sized to pass through the manway 14 and each has means on its edge surface or surfaces facing adjacent segments for engaging its adjacent segments 30 or 32 for assembly and securement by means of the spring loaded camlock component generally designated 36 in FIG. 13.

Figure 2:
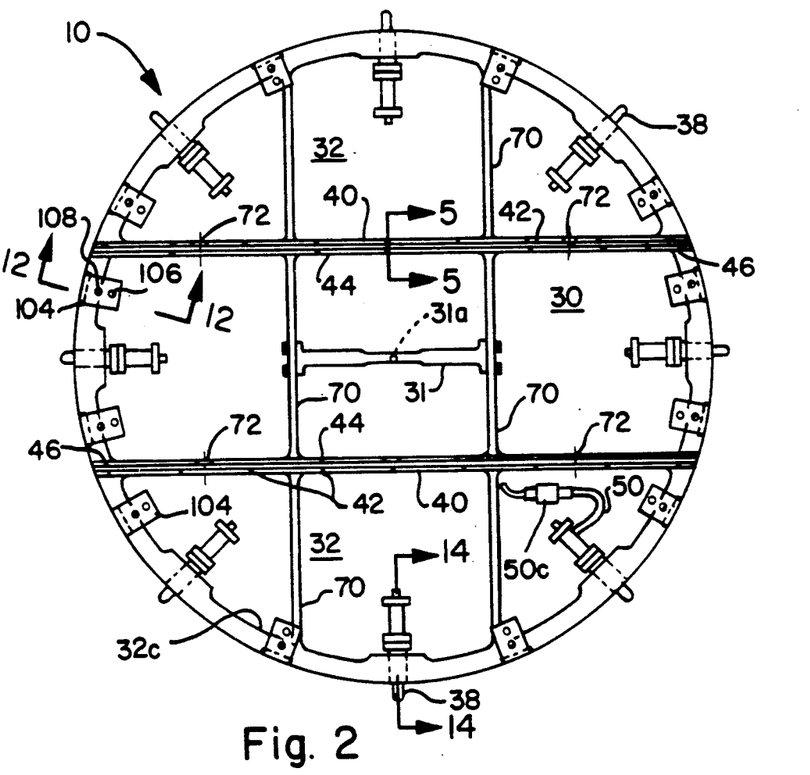
FIG. 2 is an elevation view of the ribbed concave side of the nozzle dam, which when installed faces inwardly toward the inside of the steam generator.
Figures 3, 3A:
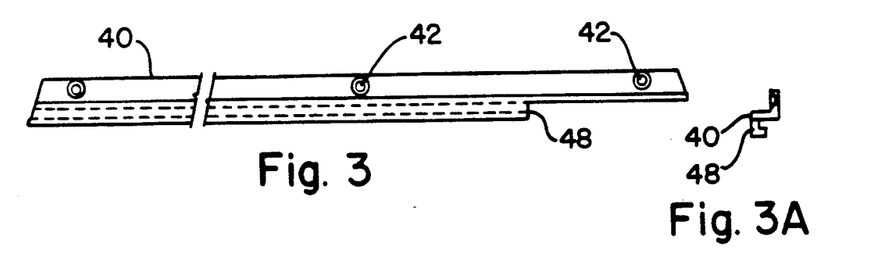
FIG. 3 is a detailed front elevational view of an outer sliding bracket for use on the edge of a dam subassembly segment.
FIG. 3A is an end view of the sliding bracket of FIG. 3.
Figure 4:
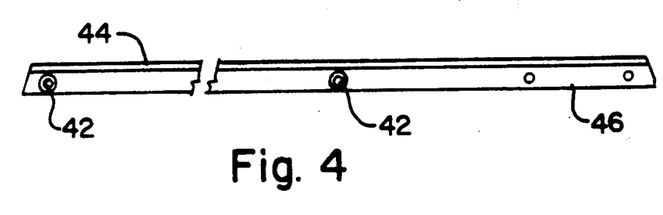
FIG. 4 is a detailed front elevational view of a support bar for use on the edge of a dam subassembly segment in sliding and mating contact with the sliding bracket of FIGS. 3 and 3A.
Figure 4A:
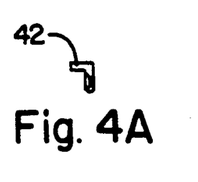
FIG. 4A is an end view of the support bar of FIG. 4.

The manipulator 22 is mounted and arranged such that its free end with clamp mechanism 24 can translate the dam subassembly or assembly 10 within the head until the dam subassembly seats within the nozzle 14 to be locked and radially secured therein or released therefrom, by remotely pneumatically actuated radial pins 38 mounted on the dam subassembly or assembly as shown in FIGS. 2 and 14.

The means on the edge surface or surfaces of the segments 30 and 32 facing adjacent segments for engaging them for assembly and securement or detachment and disassembly are called sliding brackets and cooperating support bars. In the embodiment illustrated in FIGS. 2 to 5, a sliding bracket 40 is attached by screws 42 to the outer nozzle dam segments 32 and a support bar 44 is attached by screws 42 to either side of center nozzle dam segment 30 for sliding cooperation with the sliding brackets 40. A stop block 46 is fixedly mounted on the end of the support bars 44 to engage stop surfaces 48 on sliding brackets 40 with the completion of the proper amount of sliding action to create the dam subassembly of center segment 30 and adjacent outer segments 32 is accomplished.

Figure 6:
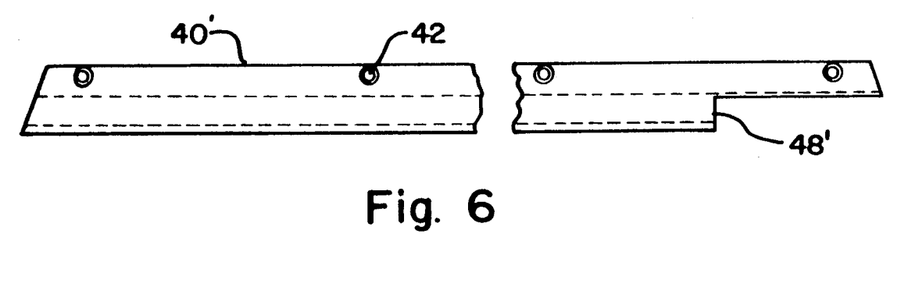
FIG. 6 is a view similar to FIG. 3 of an alternative sliding bracket.
Figure 6A:
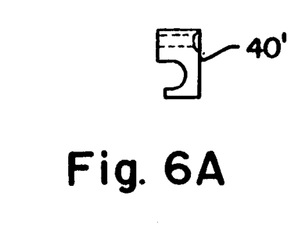
FIG. 6A is an end view of the sliding bracket of FIG. 6.
Figure 7:
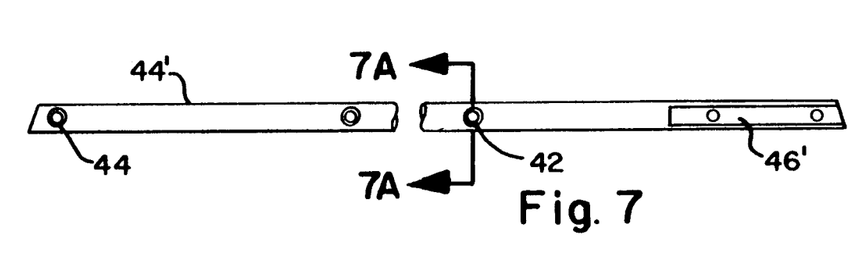
FIG. 7 is a view similar to FIG. 4 of an alternative support bar for use with the sliding bracket of FIGS. 6 and 6A.
Figure 7A:
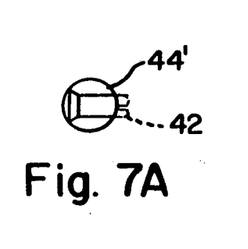
FIG. 7A is a cross-sectional view of the support bar of FIG. 7 taken along the line 7A—7A.
Figure 8:
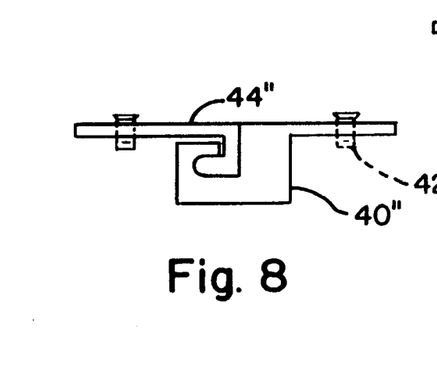
FIG. 8 is a schematic cross-sectional view similar to FIG. 5 of an alternative sliding bracket and support bar assembly between segments.
Figure 8A:
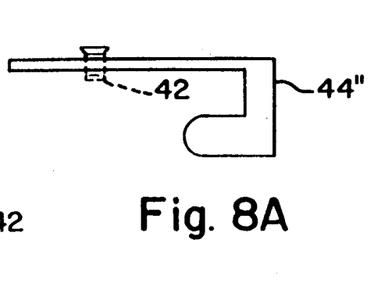
FIG. 8A is a schematic enlarged cross-sectional view of the alternative support bar of FIG. 8.
Figure 8B:
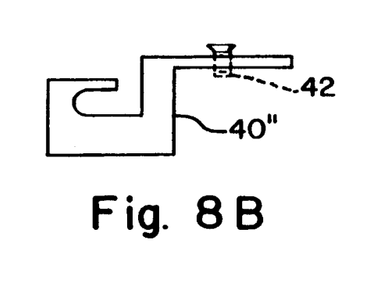
FIG. 8B is a schematic enlarged cross-sectional view of the alternative sliding bracket of FIG. 8.
Figure 9:
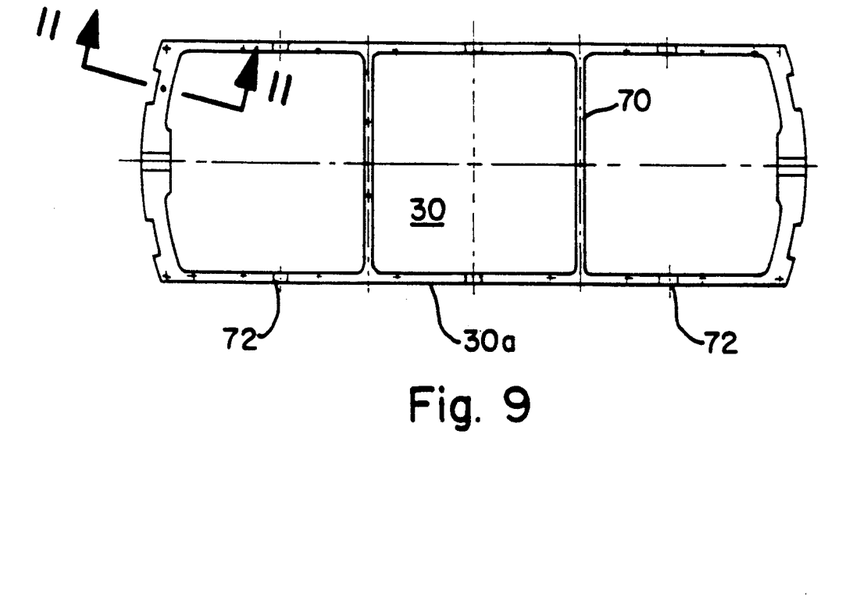
FIG. 9 is an elevational view of the ribbed side of a center or inside nozzle dam segment showing the ribbed concave side.
Figure 10:
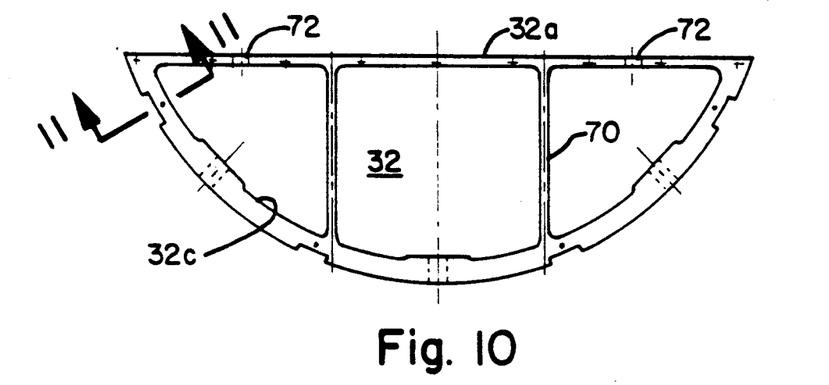
FIG. 10 is an elevational view of a ribbed side of an outer nozzle dam segment.
Figure 11:
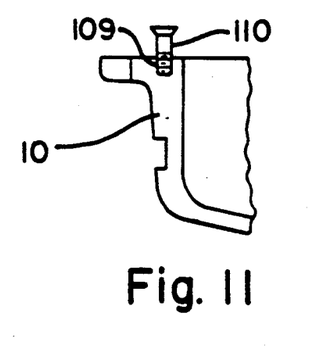
FIG. 11 is a typical cross-sectional elevational view taken along the line 11—11 in either FIGS. 9 or 10.

FIGS. 6 to 8B illustrate alternative sliding bracket, support bar and stop block combinations to those shown in FIGS. 2 to 5. The primed and double primed numbers used in FIGS. 6 to 8B, respectively, correspond to numbers and parts in FIGS. 2 to 5. The major differences between the embodiment of FIGS. 2 to 5 and the alteratives of FIGS. 6, 6A; 7, 7A; and, 8, 8A, 8B are in the shapes and in the amount of "capture" of the support bars 44, 44' and 44" by the corresponding sliding brackets 40, 40' and 40". Also, the holes for screws 42 are oriented at 90° in the alternative embodiment of FIGS. 8 to 8B, relative to the embodiments of FIGS. 2 to 7A. Notice that there can be no edgewise assembly or disassembly in FIGS. 6 to 8B, as opposed to FIGS. 2 to 5.

The sliding action between segments 30 and 32 is facilitated by orienting the center segment 30 with support bars 40 attached thereto in a generally horizontal position adjacent manway 14 by means of clamp mechanism 24, as opposed to the position of orientation schematically shown in FIG. 1. Then as a sliding bracket 40 on segment 32 moves forward toward stop block 46 for assembly, and away from block 46 for disassembly, the segments 30 and 32 are aligned relative to each other (See FIG. 5) by the application of torque, for example, in the direction of arrow "T" to move segment 32 relative to the manipulator held segment 30. The torquing in the direction of arrow "T", will align the segments 30 and 32 such that their faces 30a and 32a in FIG. 5 are substantially slightly out of contact. This will minimize sliding physical contact between surface 30a and 32a and facilitate relative sliding between the sliding bracket 40 and the support bar 44.

In order to facilitate torquing in the direction of arrow "T", for example, and for other assembly and disassembly operations to be described, a tool set is provided and used having a plurality of elongated tools as shown in FIGS. 15-21 for engagement and disengagement with said dam segments 30 and 32; spring loaded camlock components 36; and pneumatically remotely actuated radial pins 38 and fluid lines 50 with quick-connects 52 therefor. The method includes the step of providing and using the tool set of elongated tools of FIGS. 15-21, and within this step are component or subsidiary procedural steps of physical manipulation of the elongated tools of the set from outside the head 12 through the manway 14 to minimize exposure of the tool operator to radiation from within the head 12 and to avoid the necessity of the operator to enter the head.

In the case of the torquing operation functionally described above, the tool 60 of FIGS. 15 and 16 is used. Tool 60 is an elongated nozzle dam segment torquing or lifting tool. It is bifurcated and has spaced opposing members 62 and 64 which can engage the peripheral margin or rim 32c of segments 32 from outside the head 12. Torque in the direction of arrow "T" in FIG. 5 is created on segment 32 as the torquing handle 66 on the opposite end from the bifurcation formed by members 62 and 64 to separate surfaces 32a and 30a to reduce sliding friction contact therebetween. At the same time as torquing, or "lifting" as it can be termed when segments 30 and 32 are oriented generally horizontally by the manipulator 22, a pushing action for assembly toward stop block 46 can be accomplished by the tool material joining members 62 and 64. Because this portion of tool 60 is transversely extending it could also engage transverse stiffening ribs 70 of the dam subassembly 10 or the peripheral rim 32c of segments 32 for pulling to slidingly disassembly the segments 30 and 32.

Figure 17:
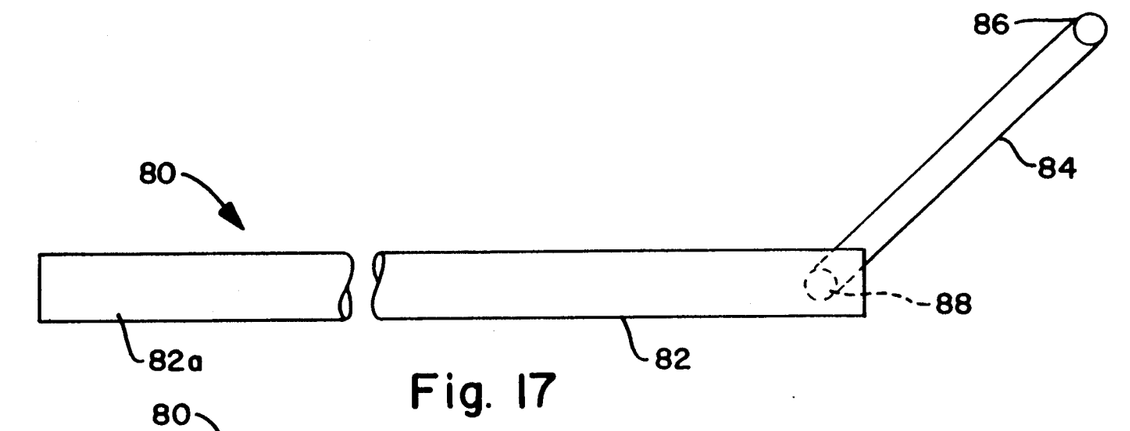
FIG. 17 is a plan view of an elongated nozzle dam camlock operating tool.
Figure 18:
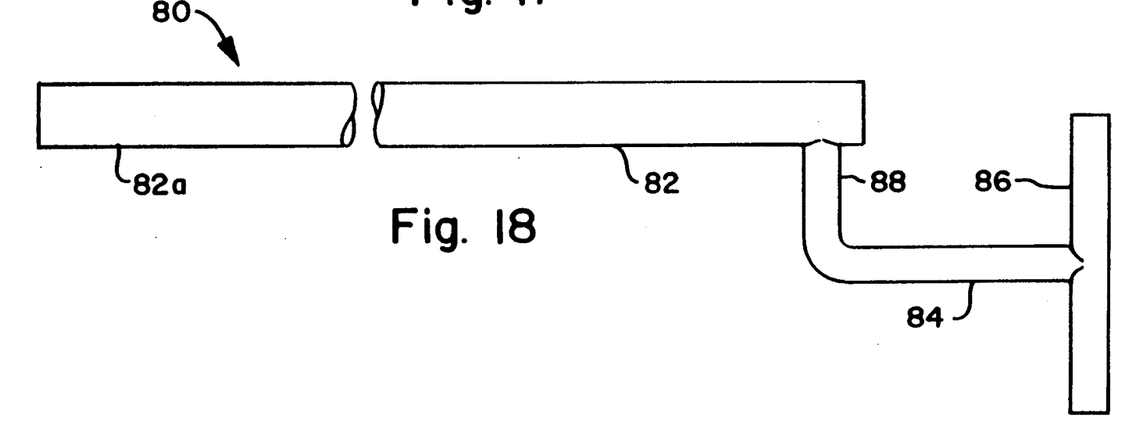
FIG. 18 is an elevational view of the tool of FIG. 17.

The method of the invention includes providing and using an elongated nozzle dam camlock operating tool 80, as shown in FIGS. 17 and 18, as part of the tool set for operation of the components 36 used in the dam subassembly for securing or detaching the aligned dam segments 30, 32 in assembled relation. The camlock operating tool 80 is used on the initially provided camlocks 36 which are mounted in openings 72 through ribs formed by the sliding face to face surfaces 30a and 32a. The tool 80 operates camlocks 36 by means of the levers 36a thereon which are oriented generally parallel to and spaced from the ribbed concave segment surface to face the inside of the head. Some of the ribs create the segment interface surfaces 32a and 32b and some of the ribs 70 are transverse thereto for stiffening the subassembly 10. The elongated tool 80 for operation of the components 36 is manipulated during use over and between the ribs to engage the levers 36a to operate the rib mounted spring loaded camlock components 36 for use in securement or detachment of the segments 30 and 32 into or from a dam subassembly 10.

Tool 80 as provided and used has an elongated shaft portion 82 with a handle end 82a and an opposite lever 36a engaging generally T-shaped end with the stem 84 and cross-member 86 of the T-shaped end offset by arm 88 from the axis of shaft 82 to permit operation of the rib mounted spring loaded camlock components 36 of the T-shaped end for securement of the segments 30 and 32 into, or detachment from, a dam subassembly 10 by engagement and manipulation of the T-shaped end 84, 86 against the lever 36a despite the lever 36a being somewhat behind the ribs 70 and 30a, 32a from the manway 14.

Figures 19, 20, 21:
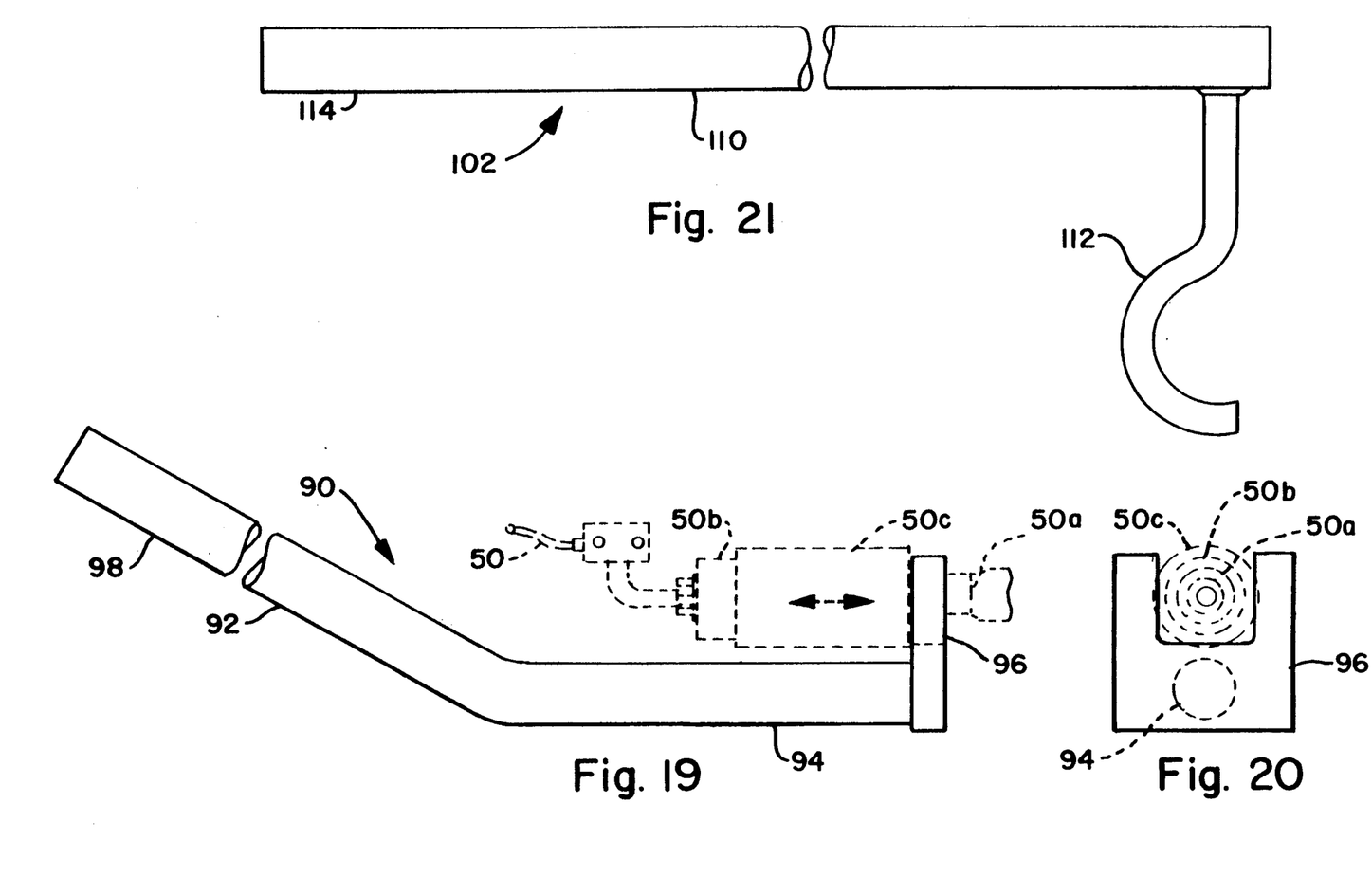
FIG. 19 is an elevational view of an elongated nozzle dam quick-connect operating tool or wrench.
FIG. 20 is an end view of the tool of FIG. 19.
FIG. 21 is an elevational view of an elongated nozzle dam seal tab tensioning or locking tool.

The method of the invention also includes the providing and using of an elongated nozzle dam quick-connect operating tool or wrench 90 for disconnection of subassembly 10 mounted remotely actuated radial pins 38 including fluid lines 50 which include quick-connects having push-pull operation for stem 50a and body portion 50b connection and disconnection by means of a spring biased body sleeve 50c, in known manner as mentioned above as a "QC" Model.

The tool 90 of FIGS. 19 and 20 includes at one end of a shaft portion 92 an offset 94 and a transverse quick-connect body-straddling bifurcated end 96 for engaging the end of spring biased sleeve 50c. A handle end 98 for manipulation outside of head 12 is provided at the opposite end of the shaft portion 92. The offset 94 provides a portion with an axis substantially parallel to the stem 50a and body 50b such that by engagement and physical manipulation of the bifurcated end 96 against the end of the sleeve 50c, from the handle end, the quick-connect "pull" operation to disconnect stem 50a and body 50b can be accomplished to disconnect the subassembly 10 mounted remotely actuated radial pins 38 fluid lines 50.

Figure 12:
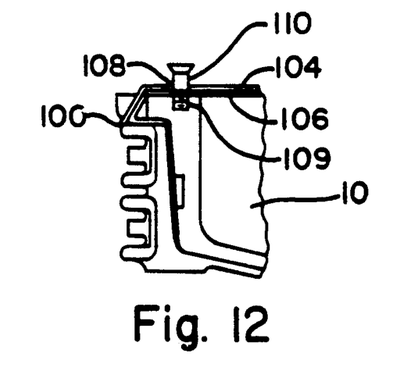
FIG. 12 is a cross-sectional view taken along the line 12—12 of FIG. 2.
Figure 15:
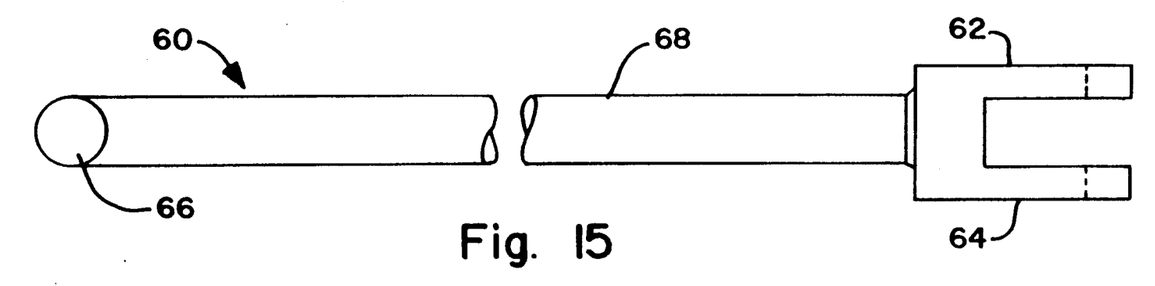
FIG. 15 is a plan view of an elongated nozzle dam segment torquing or lifting tool.
Figure 16:
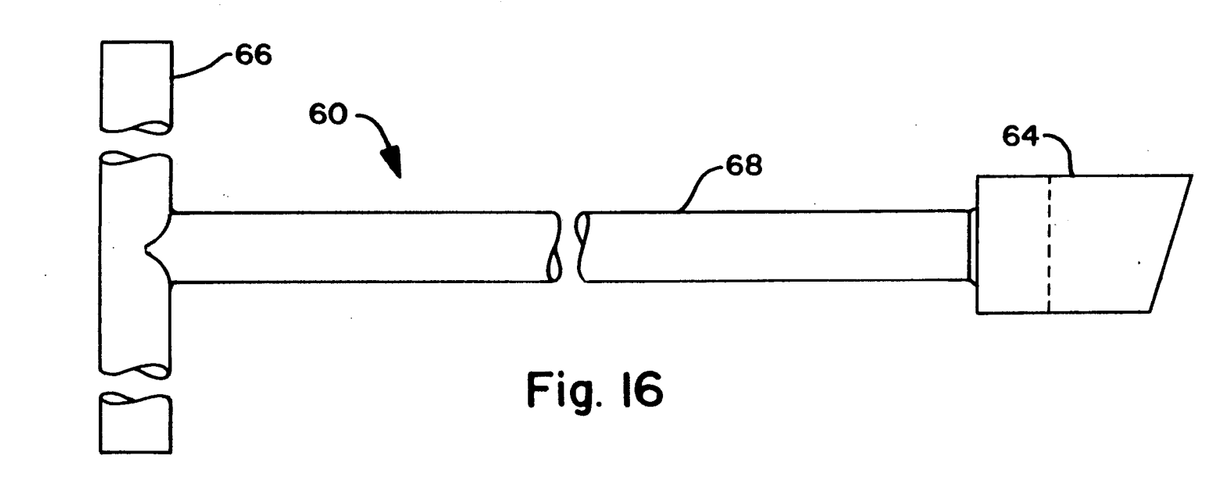
FIG. 16 is an elevational view of the tool of FIG. 15.

The method of the invention also includes the providing and using an elongated nozzle dam subassembly sealing diaphragm 100 removing and installing tool 102 as shown in FIG. 21. The sealing diaphragm, as seen in FIGS. 2, and 12 have peripheral tabs 104 tensionable, by means of openings 106 in the tabs, into hooked engagement with other tab openings 108 with projections 110 spaced on the subassembly 10 peripheral margin to face the inside of the head 12. The tabs 104 are tensioned for hooking and unhooking operations by providing and using the elongated nozzle dam seal tab tensioning or locking tool 102, for removing and installing the diaphragm 100 on subassembly 10.

The elongated tool 102 of the tool set of the method of the invention has an elongated shaft portion 110 with a transversely extending hook end 112 and an opposite handle end 114 for manipulation from outside the head 12. The tensioning of the tab includes the step of inserting the hook end 112 in a tab 104 opening 106 to provide hooking or unhooking clearance within a tab opening 108 for movement of tab 104 into or out of hooked engagement with the projection 110. A tapped hole 109 is used with a screw to provide the projection 110. The tab opening 106 is closer to the tab end than the opening 108 to facilitate use of the tool 102 in the operation. It should be clear that a single larger hole 108 could be used, however, if there were enough clearance provided for both the tool end 112 and the projection or screw 110.

Thus, it will be seen that an improved method of remotely installing or removing a nozzle dam in a nuclear steam generator without entering the generator head and by use of a set of elongated tools is provided.

We claim:

1. A method of remotely installing or removing a nozzle dam in a nuclear steam generator having a head, a manway penetrating the head, a nozzle penetrating the head, a manipulator having a free end in the head including a clamp member for holding an inner nozzle dam segment while outer nozzle dam segments are secured thereto, or detached therefrom, said dam segments sized to pass through the manway and each having means for engaging its adjacent segments thereon for assembly and securement by components into a dam subassembly, or disassembly, said manipulator mounted and arranged for translating the dam subassembly within the head until the dam subassembly seats within the nozzle to be locked and radially secured therein, or released therefrom, by subassembly mounted remotely activated radial pins, said method characterized by the steps of:

providing and using a tool set having a plurality of elongated tools for engagement and disengagement with said dam segments and with components for securement, thereby to assemble or disassemble and to secure or detach the segments during assembly into or disassembly of said dam subassembly;

said step of providing and using said tool set of elongated tools including steps of physical manipulation of the elongated tools of the set from outside the head through said manway to minimize exposure of the tool operator to radiation from within the head and to avoid the necessity of the operator to enter the head;

aligning said segments relative to each other for sliding movement into or out of assembled position during manipulation of the elongated tools; and, securing or detaching said segments in or from proper aligned position to form or disassemble a dam subassembly secured by components of said dam subassembly.

2. The method of claim 1 in which the step of providing and using a tool set includes providing and using an elongated bifurcated torquing tool to apply torque to move one segment relative to another for aligning the segments for resulting easier relative sliding movement.

3. The method of claim 1 in which the step of providing and using a tool set includes the step of providing and using an elongated tool for operation of the components used in the dam subassembly for securing or detaching the dam segments in assembled relation.

4. The method of claim 3 in which the step of providing and using an elongated tool for operation of the components used in the dam subassembly for securing or detaching the dam segments in assembled relation includes initially providing the segments with rib mounted spring loaded camlock components for use in securement of the segments together into a dam subassembly, said camlocks including levers oriented generally parallel to and spaced from a ribbed segment surface to face the inside of the head, some of said ribs creating the segment interfaces and some of said ribs transverse thereto for stiffening said subassembly, and said elongated tool for operation of the components being manipulated during use over and between said ribs to engage said levers to operate said rib mounted spring loaded camlock components for use in securement or detachment of the segments into or from a dam subassembly.

5. The method of claim 4 in which the step of providing and using an elongated tool includes providing a tool having an elongated shaft portion with a handle end and an opposite lever engaging generally T-shaped end with the stem of the T-shaped end offset from the shaft axis to permit operation of the rib mounted spring loaded camlock components for securement of the segments into or detachment from, a dam subassembly by engagement and manipulation of the T-shaped end against the lever despite the lever being somewhat behind the segment ribs from the manway.

6. The method of claim 1 in which the step of providing and using a tool set includes the step of providing and using an elongated tool for disconnection of subassembly mounted remotely actuated radial pins including fluid lines which include quick-connects having push-pull operation for stem and body portion connection and disconnection by means of a spring biased body sleeve, said tool for disconnection including an offset and transverse body-straddling bifurcated end for engaging the end of said sleeve at one end of a shaft portion and a handle end at the opposite end of a shaft portion, said offset providing a portion with an axis substantially parallel to said stem and body, such that by engagement and physical manipulation of the bifurcated end against the end of said sleeve, from the handle end, the quick-connect pull operation can be accomplished to disconnect the subassembly mounted remotely actuated radial pins' fluid lines.

7. The method of claim 1 in which the nozzle dam subassembly installing or removing includes the steps of installing on, or removing from, a subassembly, a sealing diaphragm having peripheral tabs tensionable by means of openings in the tabs into hooked engagement with projections spaced on the subassembly peripheral margin to face the inside of the head, the tabs being tensioned for hooking and unhooking operations by providing and using an elongated tool from said tool set having an elongated shaft portion with a transversely extending hook end and an opposite handle end for manipulation from outside said head, said tensioning including the step of inserting the hook end in a tab opening to provide hooking or unhooking clearance within a tab opening for movement of the tab into or out of hooked engagement with one of said projections.

8. The method of claim 7 in which there are multiple tab openings in the tab.

9. The method of claim 8 in which the opening engaged by the hooked end of the tool to which the tension of the tab is applied, is closer to the tab end than the tab opening that creates the hooked tension connection of the diaphragm to the subassembly.

* * * * *